United States Patent Office
3,554,744
Patented Jan. 12, 1971

3,554,744
ELECTROPHOTOGRAPHIC REPRODUCTION MATERIAL AND PROCESS EMPLOYING POLYIMIDE PHOTOCONDUCTORS
Keith Allan Maas, Glen Mills, Pa., assignor to E. I. du Pont de Nemours and Company, Wilmington, Del., a corporation of Delaware
No Drawing. Filed Oct. 2, 1967, Ser. No. 672,001
Int. Cl. G03g *13/22, 5/06*
U.S. Cl. 96—1.5                                                   13 Claims

ABSTRACT OF THE DISCLOSURE

An electrophotographic reproduction element wherein the photoconductor surface has a surface potential of 0.25 to 10 kv./0.001 inch thickness and is a condensation product of diamines and at least one tetracarboxylic acid moiety in which the condensation product has the repeating unit

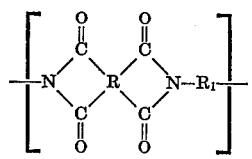

or a homopolyimide of repeating units

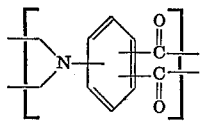

where R is an organic tetravalent radical containing at least two carbon atoms, said tetravolent radical being bonded to four carbonyl groups, no more than two carbonyl groups being bonded to any one carbon atom of said tetravalent radical, $R_1$ is an organic divalent radical containing at least two carbon atoms, said divalent radical being bonded to two nitrogen atoms, the said nitrogen atoms being attached to different carbon atoms of said divalent radical, and either R, $R_1$, or both, contain at least one ring of six carbon atoms characterized by benzenoid unsaturation. The polyimides should have an inherent viscosity of at least 0.1 measured as a 0.5% solution in concentrated sulfuric acid at 30° C. This polyimide or copolymer thereof can be the sole photoconductive insulating material used in an electrophotographic reproduction process.

BACKGROUND OF THE INVENTION

Field of the invention

This invention relates to electrophotographic reproduction wherein the electrophotographic material contains as the essential constituent a photoconductive layer which consists primarily of an organic polymeric photoconductive substance.

Description of the prior art

The invention involves the use of materials which are insulators in the dark but which become partial conductors when irradiated. These materials respond to radiant energy, being relatively conductive whenever they are irradiated and again becoming insulating when the energy is removed. Materials which exhibit this type of variable conductivity, which is dependent on the intensity of radiation, are called photoconductive insulating materials or simply photoconductors. Organic materials which are highly conjugated exhibit some slight degree of photoconductivity and are old in the art as is indicated in Dessauer & Clark, Xerography, The Focal Press, New York, 1965, pp. 169–199. A variety of inorganic semiconductive elements are also known photoconductors, i.e. amorphous selenium, sulfur, zinc oxide etc. Suitable inorganic photoconductors are disclosed in U.S. 2,663,636. Generally, most of the photoconductors disclosed in the prior art, including known polymers, have not been highly acceptable in electrostatic imaging because their photoconductive characteristics do not permit the degree of sensitivity required in a reproduction process. Although vitreous selenium has found commercial success, it has certain disadvantages. These include:

(1) rigidity and brittleness,
(2) delicate surface sensitivity to scratches,
(3) short useful life due to very low corrosion resistance and sensitivity to mild heating,
(4) insufficient reproduction qualities for halftones, i.e., insufficient resolution, and
(5) poor continuous tone reproduction qualities.

Furthermore, prior art photoconductors are opaque and cannot be used to form transparencies. It has been found that these disadvantages can be overcome by using the photoconductors disclosed herein.

SUMMARY OF THE INVENTION

This invention, in its broader aspects, relates to an electrophotographic reproduction element wherein the photoconductor is an electrostatically charged polyimide which is a linear polymerized condensation product of diamines and at least one tetracarboxylic acid moiety in which the condensation product has the repeating unit

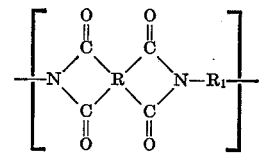

or a homopolymer of repeating units

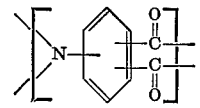

where R is an organic tetravalent radical containing at least two carbon atoms, said tetravalent radical being bonded to four carbonyl groups, no more than two carbonyl groups being bonded to any one carbon atom of said tetravalent radical, $R_1$ is an organic divalent radical containing at least two carbon atoms, said divalent radical being bonded to two nitrogen atoms, the said nitrogen atoms being attached to different carbon atoms of said divalent radical, and either R, $R_1$, or both, contain at least one ring of six carbon atoms characterized by benzenoid unsaturation. Though not required, it is preferable that both R and $R_1$ be aromatic. These polyimides generally have a potential surface of about 0.25 to 10 kilovolts per 0.001 inch thickness and an inherent viscosity of at least 0.1 measured as a 0.5% solution in concentrated sulfuric acid at 30° C.

The tetracarboxylic acids as used herein are defined to include the conventional acids containing carboxylic groups, i.e., —COOH—, as well as the carboxylic acid anhydrides, acid chlorides, and related functional derivatives.

Specifically, the polymerized condensation products referred to herein are polyimides. Copolyimides as used herein refer to copolyimide polymers where more than one different amine or more than one different tetracarboxylic acid or mixtures of said amines and said acids are reacted together.

The term "imide" as used herein refers to a compound which differs structurally from a carboxylic acid anhydride by having the >O which separates the carbonyl groups in the anhydride replaced by >NH. A "linear polyimide" is a linear condensation polymer in which the imide hydrogens of a diimide are replaced by bivalent radicals which link together the bivalent residues of the diimide molecules as recurring units in a linear polymeric chain.

When practicing this invention, the linear polymeric photoconductive layer, which is a polyimide or copolymers thereof, is carried on a support or is a self-supporting photoconductive insulating layer and is given a surface electrostatic charge. The charged surface is given a conventional exposure to actinic radiation to produce an electrostatic latent image. The photoconductive property of the linear polymeric layer causes the conductivity to increase in the exposed area, to an extent dependent on the intensity of exposure, whereby the surface charge in the exposed area is partially or wholly dissipated leaving the total charge located only in the unexposed areas. This electrostatic latent image can be developed by conventional means, e.g., by the use of electroscopic powder. The developed image may be viewed directly or transferred to a receptor, e.g., paper with volatile solvents or by applying an electric field. In addition to the conventional methods of exposure, the photoconductive polymer may be given an X-ray exposure and developed as above, resulting in an image corresponding to the X-ray beam. Likewise, as indicated herein, the photoconductive polymer can be used to produce a transparency which may be either a continuous tone or halftone reproduction.

DESCRIPTION OF THE PREFERRED EMBODIMENTS

When practicing this invention, a preferred method of carrying out the invention comprises the steps of applying an electrostatic charge to the surface of the photoconductive polymer and projecting a radiant image thereon so as to produce an electrostatic latent image corresponding to the original, developing the latent image by means of an electroscopic powder, and fixing the developed image on the surface of the photoconductive polymer or transferring the image to a receptor and fixing the image thereto.

When practicing one embodiment of this invention, a 0.0005-inch-thick polyimide film of pyromellitic dianhydride and bis(4-aminophenyl) ether is prepared as disclosed in U.S. Pat. 3,179,634 and Example 19, U.S. Pat. 3,179,633. This self-supporting polyimide film may be grounded to an electrically conductive plate, e.g., a chromium-plated steel plate which may be wet with a suitable liquid, e.g., isopropanol. The polyimide film is rubbed or squeegeed to remove air bubbles and excess liquid. The polymer surface is then charged with a conventional corona discharge device until the surface potential of the photoconductive polyimide film is 0.25 to 10.0 kv./0.001 inch, preferably 1–2 kv./0.001 inch wherein kv./0.001 inch represents surface charge/film thickness. A transparency is then placed face down on the charged polyimide and exposed as disclosed herein and in such a manner as to cause the charge in the exposed areas of the photoconductive polyimide to partially or completely dissipate while the unexposed areas retain the surface charge. Depending upon the type of electromagnetic radiation source used, the exposure time can vary from as little as 1/500 second up to 60 seconds or more. The exposed photoconductive polymer containing a latent electrostatic image is then developed by any of the conventional methods used in electrophotography. Preferably, a toner/petroleum distillate developer bath containing commercially available toner in a concentration of about 1:100 is used as the developer, The exposed photoconductive polymer is preferably developed in the bath for 10 seconds or less. An image appears on the surface of the photoconductive polymer film. This image may then be fixed as indicated herein, or transferred to a receptor surface.

When transferring the developed image from the photoconductive polyimide film, it is preferable to place the receptor sheet in contact with the developed image on the polymer film/plate arrangement and submit the sandwiched arrangement to a corona discharge. When the receptor is removed, a permanent image corresponding to the original appears on the receptor sheet. The polymer film may be recharged and reused. Other embodiments of the invention include exposing the charged photoconductive polymer to X-ray beams and obtaining an image corresponding to such beams; using the photoconductive polymer in reflex copying processes, continuous tone imaging and copying processes, other reflection processes, and for making positive and negative transparencies, projection imaging, camera exposures, etc.

The photoconductive polymer layer may vary in thickness from 0.00001 inch to 0.01 inch. It is preferred to use the thinner layers, i.e., 0.0001-inch to 0.002-inch because the rate of discharge during imaging is faster and better image resolution is obtained. Furthermore, the high fields necessary to charge the layer are more easily attained across the thin layers by comparatively low voltage equipment. The thinness of the layer is practically limited by porosity or pinholing of the photoconductive polymer surface.

The polyimides useful in this invention include polymer compositions having the recurring unit

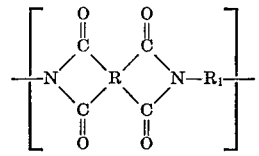

wherein R and $R_1$ represent radicals as previousy defined.

Preferably, R is a tetravalent aromatic radical, containing at least one carbocyclic or heterocyclic ring, said ring characterized by benzenoid unsaturation, the four carbonyl groups being attached directly to separate carbon atoms in a ring and each pair of carbonyl groups being attached to adjacent carbon atoms in a ring of the R radical. Adjacent means ortho or peri, so that the dicarboxylanhydro rings are 5- or 6-membered, respectively.

It is preferred that the dicarboxylanhydro rings, if any are present, be as follows:

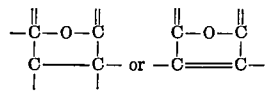

Preferably $R_1$ is an arylene, that is, a divalent aromatic radical containing at least one carbocyclic or heterocyclic ring, said ring characterized by benzenoid unsaturation, the two substituents being attached directly to separate carbon atoms of the radical.

More specifically, R and $R_1$ are preferably selected from the group

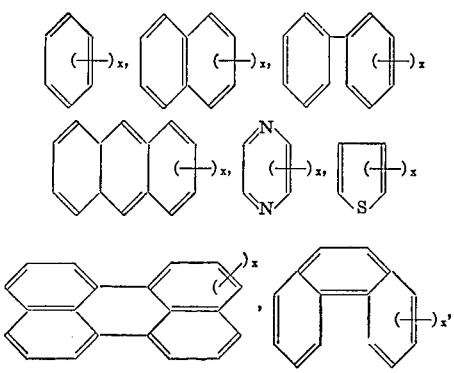

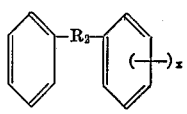

wherein $R_2$ is an alkylene of 1–3 carbon atoms, oxygen, sulfur, or one of the following:

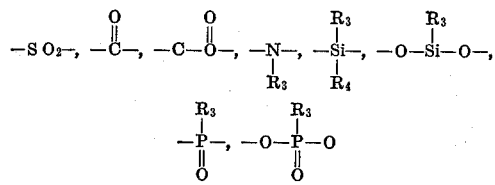

wherein $R_3$ and $R_4$ are alkyl or aryl, and substituted groups thereof. For R, $x$ takes the value 4 and for $R_1$, $x$ takes the value 2.

Specifically, the polyimides are condensation products of organic diamines and tetracarboxylic acid dianhydrides, the organic diamines having the formula $H_2N$—$R_1$—$NH_2$, where $R_1$ is preferably a divalent aromatic radical (arylene), preferably one of the following groups: phenylene, naphthylene, biphenylene, anthrylene, and (I) 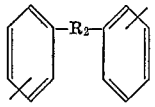

wherein $R_2$ is as defined previously. Other suitable radicals include furylene, benzfurylene, etc., alkylene diamines such as nonamethylenediamine, etc.

Among the diamines suitable for use in the present invention are: meta-phenylenediamine; paraphenylenediamine; 2,2-bis(4-aminophenyl)propane; 4,4′-diaminodiphenylmethane; 4,4′-diaminodiphenyl sulfide; 4,4′-diaminodiphenyl sulfone; 3,3′-diaminodiphenyl sulfone; 4,4′-diaminodiphenyl ether; 2,6-diaminopyridine; bis(3-aminophenyl)diethylsilane; benzidine; 3,3′-dichlorobenzidine; bis(4-aminophenyl)ethyl-phosphine oxide; 4,4′-diaminobenzophenone; bis(4-aminophenyl)phenylphosphine oxide; N,N-bis(4-aminophenyl)butylamine; N,N-bis(4-aminophenyl)methylamine; 1,5-naphthalenediamine; 3,3′-dimethyl-4,4′-diaminobiphenyl; 3,4′-diaminobenzanilide; 4-aminophenyl 3-aminobenzoate; 2,4-bis(beta-amino-t-butyl)-toluene; bis(p-beta-amino-t-butylphenyl)ether; p-bis-2-(2-methyl-4aminopentyl)benzene; p-bis(1,1-dimethyl-5-aminopentyl)benzene; m-xylylenediamine; p-xylylenediamine; N,N-bis(4-aminophenyl) phenylamine; and mixtures thereof.

When the acid anhydride is aromatic, it is not necessary that $R_1$ in the diamine be an aromatic. In such instances, $R_1$ may be a divalent hydrocarbon radical, preferably a polymethylene radical, e.g., ethylene, trimethylene, tetramethylene, etc., or $R_1$ may be an alkylene radical such as propylene, butylene, etc.

The tetracarboxylic acid dianhydrides are characterized by the following formula:

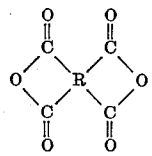

where R is a tetravalent organic radical, as previously defined. In these dianhydrides, every carbonyl group is attached directly to a separate carbon atom of the aromatic radical, the carbonyl group being in pairs, the groups of each pair being adjacent to each other. Adjacent means ortho or peri, so that the dicarboxylanhydro rings are 5- or 6-membered, respectively.

Illustrations of dianhydrides suitable for use in the present invention include: pyromellitic dianhydride; 2,3,6,7-naphthalenetetracarboxylic dianhydride, 3,3′,4,4′-diphenyltetracarboxylic dianhydride; 1,2,5,6-naphthalenetetracarboxylic dianhydride; 2,2′,3,3′-diphenyltetracarboxylic dianhydride; 2,2-bis(3,4-dicarboxyphenyl)propane dianhydride; bis(3,4-dicarboxyphenyl)sulfone dianhydride; 3,4,9,10-perylenetetracarboxylic dianhydride; bis(3,4-dicarboxyphenyl) ether dianhydride, ethane-1,1,2,2-tetracarboxylic dianhydride; naphthalene-1,2,4,5-tetracarboxylic dianhydride; naphthalene-1,4,5,8-tetracarboxylic dianhydride; decahydronaphthalene-1,4,5,8-tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; phenanthrene-1,8,9,10-tetracarboxylic dianhydride; cyclopentane-1,2,3,4-tetracarboxylic dianhydride; pyrazine-2,3,5,6-tetracarboxylic dianhydride; 2,2-bis(2,3-dicarboxyphenyl)propane dianhydride; 1,1-bis(2,3-dicarboxyphenyl)ethane dianhydride; 1,1-bis-(3,4-dicarboxyphenyl)ethane dianhydride; bis(2,3-dicarboxyphenyl) methane dianhydride; benzene-1,2,3,4-tetracarboxylic dianhydride; 1,2,3,4-butanetetracarboxylic dianhydride; thiophene-2,3,4,5-tetracarboxylic dianhydride; 3,4,3′,4′-benzophenonetetracarboxylic dianhydride; 2,3,2′,3′-benzophenonetetracarboxylic dianhydride; 2,3,3′,4′-benzophenonetetracarboxylic dianhydride; etc.

Polyimides included within the scope of this invention can be prepared from the above reactants as described in U.S. Pats. 2,710,853; 3,179,633; and 3,179,634.

The photoconductive polyimides may be employed in the form of a self-supporting film or as a coating on a support. In either case, one side of the photoconductive polymeric layer is preferably in contact with an electrically conductive surface during charging of the photoconductive polymer surface. If the photoconductive polymer is a self-supporting film, the film may be metallized on one side or laminated to a metal foil such as aluminum, silver, copper, nickel, etc. Alternatively, the polymer may be brought into electrically conductive contact with a conducting layer. To insure good contact of photoconductive film with the conducting layer, the film surface in contact with the conducting layer may be wet with a liquid such as water or organic solvent, e.g. ethanol, acetone, etc.

When the photoconductive polymers of this invention are coated on the surface of a support, the polymer may be applied in any of the conventional forms, e.g., spraying, brushing, coating, etc. The polymer is generally applied as a solution in a suitable liquid or as a precursor of the polymer. Also, the polymer when applied to the support need not necessarily be a prepolymerized substance. Mixtures of monomers or blends of monomers and polymeric substances may be applied to the conductive surface of the support and then polymerized by any of the methods well known in the art.

As indicated previously, the photoconductive polymer in the form of a self-supporting film or a coating is preferably in contact with an electrically conductive surface as it is being charged. The electrically conductive surface may be a plate, sheet, or layer whose specific resistivity is smaller than that of the photoconductive layer, i.e., in general smaller than $10^9$ ohm.cm, preferably $10^5$ ohm.-cm. or less. Suitable supports include metal sheets, e.g., iron, aluminum, copper, etc., insulators such as glass, plastic film, paper, polyesters, etc., coated on at least one side with a conductive coating. The conductive coating may be a layer of metal, e.g., aluminum, tin, silver, etc., or highly electrically conductive coatings of binder agents, e.g., polyvinyl alcohol, glycols, etc.

Suitable conductive sheets include films made of polyurethane, polyvinyl alcohol, etc.

Paper supports may also be satisfactorily used with limitations of conductivity as indicated above. Such papers may in themselves be electrically conductive or contain surface coatings which render them electrically conductive.

The surface of the photoconductive polymer can be charged for image retention according to any of the conventional techniques known in electrophotography. These include corona discharge, contact charge, discharge of a capacitor, etc. Suitable corona charging devices are described in U.S. Pats. 2,777,957 and 2,836,725. The charging of the free surface of the photoconductive polymer is preferably carried out in the dark or in subdued illumination. The preferred polymers of this invention are generally charged at a field gradient of 1–10 kv./0.001 inch thickness, negative potential. Either a negative or positive potential can be used through a negative potential is preferred when positively-charged developers are used. Polymer surface potentials as low as 0.5 kv./0.001 inch give good results. During charging, the electrically conductive surface of the support or the electrically conductive surface on which the self-supporting polymer may be resting must be grounded. Such grounding is not required during imaging of the charged photo- Electrophotographic polymers of this invention can be used in various reproduction techniques wherein different types of radiation are used. Electromagnetic radiation including ultraviolet, visible, X-rays, infrared, high energy electrons and nuclear radiations can all be employed to expose the charged photoconductive polymers of this invention. When using an actinic radiation source, the charged photoconductive polymer of the preferred thicknesses disclosed herein can be given camera speed exposures of $1/500$ second and satisfactory developable images produced. Many of the polymers, absorb some radiation throughout the visible range of the spectrum and so are sensitive between 400-700 m$\mu$. Ultraviolet response appears to increase toward the far ultraviolet wavelengths. Satisfactory images are also obtained when the polymers of this invention are charged and exposed to X-rays as indicated in the examples. Images on charged photoconductive polymer surfaces can also be obtained using electron bombardment techniques.

Within the scope of exposure techniques of this invention, reflection exposure can be used to produce satisfactory reflex copies. This technique is further illustrated by the examples.

When the charged, photoconductive polymers of this invention are exposed imagewise to electromagnetic radiation the exposed areas are discharged leaving the unexposed areas charged. This electrostatic latent image can then be converted into a visible image according to conventional electrophotography development techniques. Suitable developers include charged aerosols, powders, or liquids containing finely divided, colored substances which are attracted to the charged image areas. Preferably, the latent image is developed by contacting it with a developer consisting of a carrier and a toner, suitable carriers being small glass balls, iron powder, plastic balls, or a low boiling dielectric liquid. The toner is generally a resin/pigment mixture with a grain size of 1–100$\mu$. Suitable developers are disclosed in U.S. Pats. 2,899,335 and 2,965,573.

The developed image may then be transferred to receptor sheets for as many as four or more transfers without reexposing or retoning the image. The image may be retoned and further copies obtained. If desired, the image can be fixed on the surface of the photoconductive polymer, after development, by any of the conventional methods in electrophotography, i.e., heating or as disclosed in British Pat. 658,699.

Various modifications can be practiced within the scope of this invention. For instance, if a self-supporting film is used as the photoconductive polymer layer both a negative and positive image can be obtained. When the film is charged, the top surface of the polymer carries a charge which is the opposite of the charge on the bottom surface of the polymer film. If the photoconductive film is negatively charged on the top surface and then exposed to a positive image master from the top, the charge in the exposed areas is dissipated on both the top and bottom surface of the film. If a positive developing toner is used, the top surface of the film which is negatively charged in the unexposed areas will attract the positive developer to produce a visible positive image. On the bottom side of the film the unexposed areas will be positively charged and when developed with a positive developer, a negative image is observed. Either or both of these images may be transferred. Similar results can be obtained by charging the top surface of the film either negatively or positively and selecting a developer of like charge.

The electrophotographic images of this invention can be transferred to a conventional hydrophilic base, and can be used to prepare a printing plate. The printing plate can be mounted on an offset printing press, inked and copies produced. The developed images may also be transferred to a conventional offset master and the master used to obtain conventional offset copies.

Electrophotographic materials according to the present invention can be used in any of the different techniques which are based on the exposure and discharge of an electrostatic charge in or on a photoconductive surface.

The following examples will further illustrate but are not intended to limit the scope of this invention.

EXAMPLE 1

A 0.0005-inch-thick polyimide film of pyromellitic dianhydride and bis (4-aminophenyl) ether was prepared as disclosed in Example 19, U.S. Pat. 3,179,634 except that the film was cast as disclosed in Example 1 of that patent. The film was placed on a smooth surfaced, 0.02-inch-thick, chromium-plated steel plate which had been wetted with isopropanol. All air bubbles were removed by pressing across the film with a hard rubber squeegee. The excess isopropanol was then wiped off with a paper towel. This sandwiched arrangement was then passed film side up, at a distance of six millimeters under two parallel, 0.003-inch-diameter tungsten wires of a conventional corona discharge apparatus. The wires were surrounded at a distance of approximately eight millimeters by an aluminum semicircular shield. The wires were connected to the negative output of a Spellman Lab-10 high voltage power supply. The metal plate and aluminum shield were at zero potential and the wires were supplied with 4.5 kv. Five passes of the film under the wires for 15 seconds total duration charged the polyimide film to a surface potential of 3.6 kv./0.001 inch. A positive continuous tone transparency was then placed face down on the charged film and a glass plate placed on top of the transparency. The photoconductive polyimide film was exposed through the transparency by a General Electric AH–3 mercury arc lamp for two seconds at a distance of four inches from the transparency. An electrostatic latent image was thus formed on the surface of the polyimide film. The film and plate were then placed for 10 seconds in a developer bath of conventional commercially available toner and petroleum distillate at a concentration of toner to distillate of 1:100. A positive, reverse-reading image of the positive transparency appeared on the film. This image was transferred to a sheet of white bond paper by placing the paper over the image on the film and passing the sandwiched arrangement beneath the corona discharge wires as above. The wires were supplied with 3.5 kv. The paper was removed from the film and a right-reading, positive, high-resolution image of the transparency appeared on the sheet. The image resisted smudging. Room lights were on during the entire process.

EXAMPLE 2

Example 1 was repeated except that the image was transferred to a 0.001-inch-thick film of polyethylene terephthalate. An exact reproduction of the master was produced which was then useable as a projection transparency.

EXAMPLE 3

A 0.002-inch-thick polyimide film was prepared as in Example 1. The film was placed between two aluminum electrodes and charged with an applied voltage of 2 to 4 kv. The electrodes were removed and the film was exposed to a master on a sheet of paper by a No. 2 Photoflood lamp operating at 110 volts, for 30 seconds at a distance of approximately 9 inches. The electrostatic latent image was developed by dusting the film surface with a conventional toner powder causing a positive image of the master to appear. The image was then transferred to a sheet of paper as in Example 1 except that the transferred image was fused to the paper by heating on a hot plate.

EXAMPLE 4

Example 1 was repeated except that the charged, exposed, polyimide film was removed from the chromium-steel plate before development in the toner bath. After development as in Example 1 a positive, reverse-reading, image appeared on the top surface (negatively charged) of the film. A negative, right-reading image appeared on the bottom surface (the one which had been in contact with the steel plate) of the film. The developed film was sandwiched between two sheets of paper and the sandwich placed on the metal plate. The images were then transferred by use of the corona discharge as in Example 1. One sheet contained a positive, right-reading image from the top surface of the film, and the other sheet carried a negative, reverse-reading image from the opposite side of the film.

EXAMPLE 5

Example 1 was repeated except that three test samples of the polyimide film 0.0005-inch, 0.001-inch, and 0.002-inch thick were each bonded as in Example 1 to a 0.003-inch-thick aluminum sheet. The elements were charged as in Example 1 except that the voltage to the tungsten wires was 15 kv. and the distance between the film samples and the wires was one inch. Each sample while still on the aluminum base was then exposed to a 16 kv., 7.8 ma. X-ray beam approximately four inches from the source for one second or more. The exposed elements were developed for 5 seconds as in Example 1. A positive image of the beam appeared on each film. The films were then heated to permanently fix the dusted images. Low level lights were used through the entire process.

EXAMPLE 6

Example 1 was repeated except that the polyimide film and plate were placed in the focal plane of a graphic press camera (f/4.5 lens) after charging of the film. The photoconductive polyimide film was exposed at f/4.5 for 5 seconds at 60 cm. from a printed image to the lens while illuminating the printed image with a Sylvania Sun Gun II, SG 55, set at 60 cm. A good positive image was developed and transferred to white bond paper as in Example 1. A good, positive, high resolution, right-reading image appeared on the paper and was a 10.5× area reduction of the original.

EXAMPLE 7

Example 1 was repeated except that the charged polyimide film was removed from the metal plate and placed in a glass printing frame. A 35 mm. transparency image was focused on the film in a 500-watt projection system. Exposure time in this manner was one second while the room lights were off. The exposed photoconductive polyimide film was developed as in Example 1. The image produced on the film was a 4.5× enlargement of the original transparency exhibiting good continuous tone qualities.

EXAMPLE 8

Example 5 was repeated except that the samples of the polyimide film were all 0.0005-inch-thickness. The samples, after being charged to a surface potential of 4 kv./mil, were placed in an electron microscope cassette and irradiated for 1, 5, 30 seconds respectively with a 50-kv. beam of electrons. The images of the beam were developed and fixed as in Example 5. Good beam images were recorded on each of the films.

EXAMPLES 9-11

Example 5 was repeated except that the polypyromellitimide was replaced with 0.002-inch-thick films as follows: (1) a polyimide film of pyromellitic dianhydride and diaminodiphenyl methane (approximately equal mol percent of diamine and dianhydride), (2) a polyimide film of pyromellitic dianhydride and 4,4'-diaminodiphenyl sulfide (approximately equal mol percent of diamine and dianhydride), (3) a copolyimide film of m-phenylene diamine, bis(4 - aminophenyl)ether, pyromellitic dianhydride. Results similar to those of Example 5 were obtained.

EXAMPLE 12

Example 1 was repeated except that the polyimide film was a 0.001-inch-thick film of azodiphthalic dianhydride and 4,4'-diamino azobenzene. The film placed on the chromium-steel plate was charged to a surface potential of 1 kv./mil. A transparency and glass plate were consecutively placed on top of the film and exposed to a 500-watt Photoflood lamp at a distance of 3 inches, for two seconds. The lamp, glass, and transparency were removed and the exposed polymer surface sprayed with a conventional, commercially available, dry toner. A good positive image appeared on the film after one to two passes with the toner. The image could be transferred to a receptor as in Example 1.

EXAMPLES 13-24

Example 12 was repeated except that each time, the polymer films were replaced by one of the following.

| Example No. | Film thickness, inch | Polymer |
| --- | --- | --- |
| 13 | 0.0015 | A polyimide [1] of azodiphthalic dianhydride and bis(4-aminoazobenzene) ether. |
| 14 | 0.0015 | A polyimide [1] of pyromellitic dianhydride and bis(4-aminoazobenzene) ether. |
| 15 | 0.002 | A copolyimide of pyromellitic dianhydride and amines wherein 60 mol percent of the amine is bis(4-aminophenyl)ether and 40 mol percent is m-phenylene diamine. |
| 16 | 0.0015 | A polyimide [1] of pyromellitic dianhydride and m-phenylene diamine. |
| 17 | 0.001 | A polyimide [1] of pyromellitic dianhydride and 4,4'-diaminodiphenyl propane. |
| 18 | 0.0015 | A polyimide [1] of pyromellitic dianhydride and benzidine. |
| 19 | 0.001 | A copolyimide of pyromellitic dianhydride and amines wherein 50 mol percent of the amine is m-phenylene diamine and 50 mol percent is 4,4'-diaminodiphenyl propane. |
| 20 | 0.001 | A copolyimide as in Ex. 19 except that the amines were 50 mol percent benzidene and 50 mol percent bis(4-aminophenyl)ether. |
| 21 | 0.002 | A copolyimide as in Ex. 19 except that the amines were 50 mol percent bis(4-aminophenyl)sulfide and 50 mol percent p-phenylene diamine. |
| 22 | 0.0015 | A polyimide [1] of pyromellitic dianhydride and 4,4'-diaminodiphenyl methane. |
| 23 | 0.001 | A polyimide [1] of pyromellitic dianhydride and bis(4-aminophenyl)sulfide. |
| 24 | 0.001 | A copolyimide of two dianhydrides wherein 50 mol percent of the dianhydride is 3,4,3',4'-biphenyl tetracarboxylic dianhydride and 50 mol percent is pyromellitic dianhydride and the amine is bis(4-aminophenyl)ether. |

[1] Approximately equal mol percents of diamine and dianhydride.

Results comparable to those of Example 12 were obtained with the use of each of the polymer films.

EXAMPLE 25

A 0.0001-inch coating of the polypyromellitimide of bis(4-aminophenyl) ether was prepared directly on a 0.006-inch thick aluminum plate as disclosed in Example 19, U.S. Pat. 3,179,634. The photoconductive polymer surface of the plate was charged, exposed, developed and transferred to a receptor sheet as in Example 1 leaving a positive, right-reading image on the paper. The polymer coating was then wiped clean with a paper towel and acetone and dried in room air. The entire process of this example was repeated a total of 10 times, each time transferring the positive image to the receptor. Image quality was excellent with no interference from previous copies.

EXAMPLE 26

Example 1 was repeated except that, after charging the polymer film, it was removed from the steel plate and given a reflex exposure. The charge surface was placed in intimate contact with a printed halftone image. Exposure was through the polymer film with a 500-watt projection lamp for one second at three feet. The electrostatic latent image was developed as in Example 1 and a positive, reverse-reading image appeared on the charged surface which had been exposed in contact with the image. A negative, right-reading image appeared on the opposite side of the film. The developed images were transferred to paper as in Example 1. This example was successfully repeated by placing the charged surface of the film away from the printed image as well as when a 0.001-inch thick polyethylene terephthalate sheet was placed between the image and the charged surface of the film. Satisfactory results were also obtained by replacing the image with (1) black/white inverse transfer print, or (2) a four color print. Halftone dot resolution in each case was very good.

EXAMPLE 27

Example 1 was repeated except that the polyimide film was a 0.001-inch-thick film derived from 4-aminophthalic anhydride which was prepared as disclosed in Journal of American Chem. Soc., 30, 1135 (1908). A very good positive image was obtained.

This invention offers the advantage of being able to use a reflex copy process and obtain high resolution of halftone dots and continuous tone images. Copies of images are of the same quality as silver halide reproductions. Such reproductions can be obtained without the use of special imaging and development equipment.

The use of continuous tone devices has not been widely accepted in industry because of various drawbacks such as expensive equipment additions to existing devices. It has been found that this invention overcomes these drawbacks and can be successfully used in commercial continuous tone copying processes. The elements of this invention can be used in photogravure processes. Because of these high quality copying characteristics, the photoconductive polymers of this invention can be used in photofinishing operations.

This invention employs photoconductors which are tough, durable, flexible and transparent. The polymers form homogeneous layers which require no additional binding agents or other substances to render them photoconductive. If desired, conventional binding agents may be used but they are not required. The polymers offer the further advantage that they may be used as self-supporting films. Such films can be used to prepare dual images, i.e., an image on each side of the film from which multiple copies of each image can be obtained. The polymers are abrasion and scuff resistant, have good thermal stability and resist fatigue by heat and light. The polymers will accurately copy large solid dark areas as well as areas of gradually changing tone value. In short, the photoconductive polymers of this invention provide in a single material, a combination of desirable features not heretofore possessed by any known photoconductor.

The photoconductive material of this invention can be used to replace commercially available imaging surfaces, e.g. vitreous selenium, in commercial xerographic apparatus such as described in U.S. Pat. 2,970,906.

The embodiments of the invention in which an exclusive property or privilege is claimed are defined as follows:

1. In a process for image reproduction from a photoconductive element comprising imagewise exposing said element to produce an electrostatic latent image and developing said latent image, the improvement which comprises effecting said process utilizing a photoconductive element wherein the sole latent image-forming photoconductive material consists essentially of a uniformly electrostatically charged polyimide stratum, said polyimide being the condensation product of at least one diamine and at least one tetracarboxylic acid moiety in which the condensation product has the repeating unit:

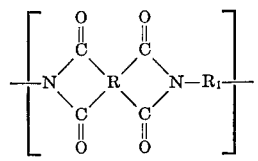

or a homopolyimide of repeating units:

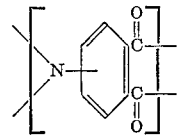

where R is an organic tetravalent radical containing at least two carbon atoms and said tetravalent radical being bonded to four carbonyl groups with no more than two carbonyl groups being bonded to any one carbon atom of said tetravalent radical, $R_1$ is an organic divalent radical containing at least two carbon atoms where said divalent radical is bound to two nitrogen atoms and said nitrogen atoms being attached to different carbon atoms of said divalent radical, with the proviso that either R, $R_1$, or both radicals contain at least one ring of six carbon atoms characterized by benzenoid unsaturation.

2. A process as in claim 1 where said polyimide has an inherent viscosity of at least 0.1 measured as a 0.5% solution in concentrated sulfuric acid at 30° C.

3. A process as in claim 1 where said latent image is developed by contacting said image with a toner composition.

4. A process as in claim 1 where said polyimide has a potential of about 0.25 to 10 kilovolts per 0.001 inch thickness.

5. A process as in claim 4 where said polyimide has a potential of about 1 to 2 kilovolts per 0.001 inch thickness.

6. A process as in claim 4 where said polyimide stratum is in integral contact with a support whose contacted surface has a specific resistivity of less than $10^9$ ohm. cm.

7. A process as in claim 4 where said polyimide is a film which has a thickness of from 0.00001 to 0.01 inch.

8. A process as in claim 4 where said developed image is placed in contact with a receptive support and said image is transferred to said support by exposure to an electrostatic charge.

9. A photoconductive element having as the sole latent image-forming, photoconductive material, a uniformly electrostatically charged polyimide stratum having a surface potential of 0.25–10.0 kv./0.001-inch thickness, said polyimide being the condensation product of at least one diamine and at least one tetracarboxylic acid moiety in which the condensation product has the repeating unit:

or a homopolyimide of repeating units:

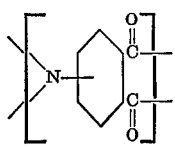

where R is an organic tetravalent radical containing at least two carbon atoms and said tetravalent radical being bonded to four carbonyl groups with no more than two carbonyl groups being bonded to any one carbon atom of said tetravalent radical, $R_1$ is an organic divalent radical containing at least two carbon atoms where said divalent radical is bound to two nitrogen atoms and said nitrogen atoms being attached to different carbon atoms of said divalent radical, with the proviso that either R, $R_1$, or both radicals contain at least one ring of six carbon atoms characterized by benzenoid unsaturation.

10. An element as in claim 9 where said polyimide has an inherent viscosity of at least 0.1 measured as a 0.5% solution in concentrated sulfuric acid at 30° C.

11. An element as in claim 9 where said polyimide has a potential of about 1 to 2 kilovolts per 0.001 inch thickness.

12. An element as in claim 11 having a support in integral contact with said polyimide where the surface of said support touching said polyiimde has a specific resistivity of less than $10^9$ ohm. cm.

13. An element as in claim 12 where said polyimide has a thickness of about 0.00001 to 0.01 inch.

References Cited
UNITED STATES PATENTS

| | | | |
|---|---|---|---|
| 3,073,784 | 1/1963 | Endrey | 252—518 |
| 3,169,060 | 2/1965 | Hoegl | 96—1 |
| 3,179,633 | 4/1965 | Endrey | 260—78 |
| 3,179,634 | 4/1965 | Edwards | 260—78 |
| 3,240,597 | 3/1966 | Fox | 96—1 |

GEORGE F. LESMES, Primary Examiner

J. C. COOPER, Assistant Examiner

U.S. Cl. X.R.

96—1; 117—17.5; 260—78